Figure 2:
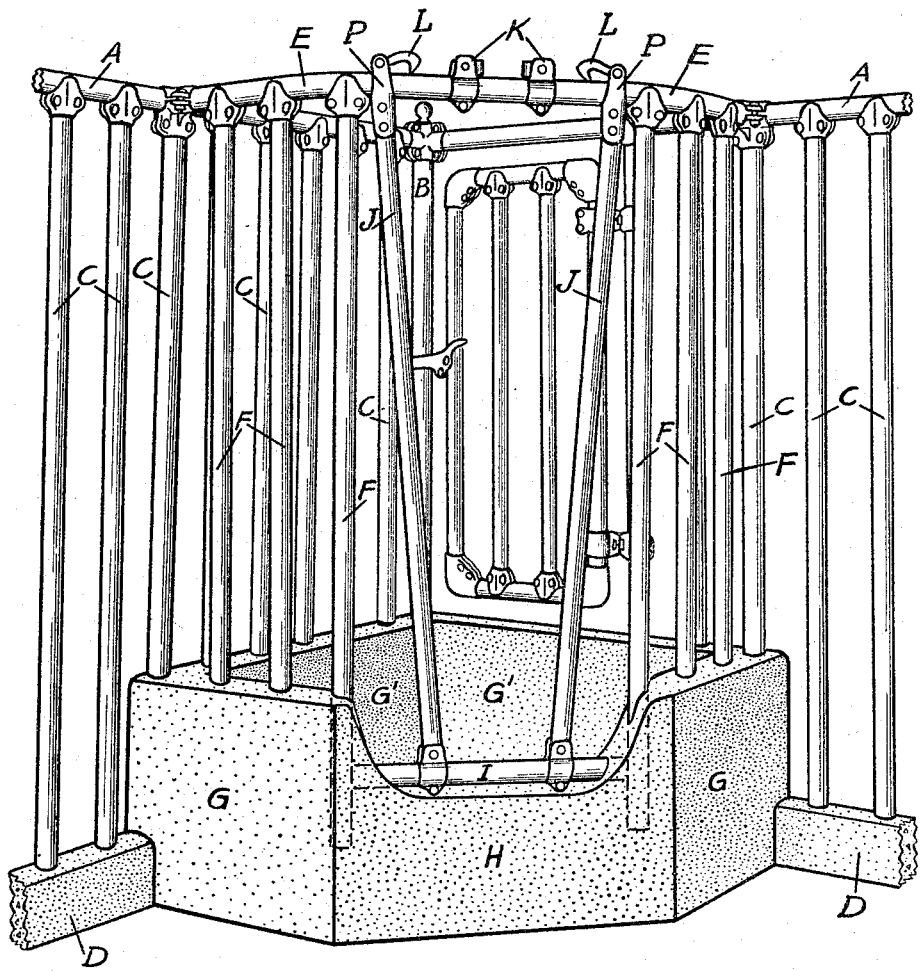

W. LOUDEN.
MANGER FOR ANIMAL PENS.
APPLICATION FILED NOV. 26, 1915.
1,192,080.
Patented July 25, 1916.
2 SHEETS—SHEET 1.
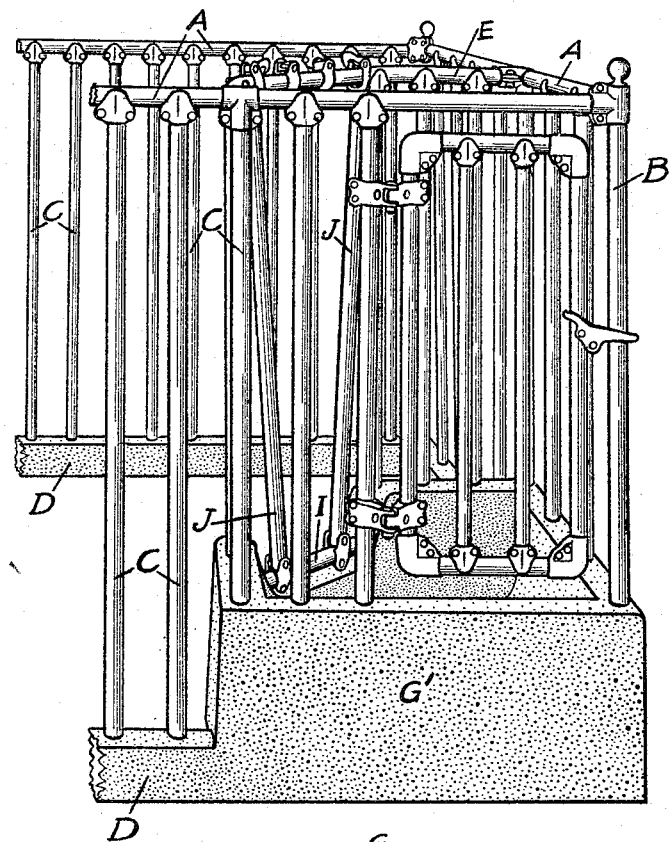
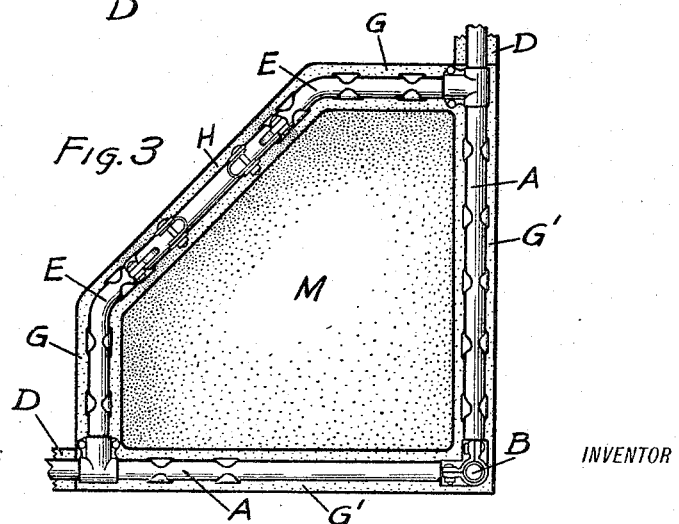
WITNESSES:
Roy Louden.
Lorenzo Heston.
INVENTOR
William Louden.

UNITED STATES PATENT OFFICE.

WILLIAM LOUDEN, OF FAIRFIELD, IOWA.

MANGER FOR ANIMAL-PENS.

1,192,080.      Specification of Letters Patent.      Patented July 25, 1916.

Application filed November 26, 1915. Serial No. 63,452.

*To all whom it may concern:*

Be it known that I, WILLIAM LOUDEN, a citizen of the United States, residing at Fairfield, in the county of Jefferson and State of Iowa, have invented a new and useful Improvement in Mangers for Animal-Pens, of which the following is a specification.

My invention relates to mangers to be constructed in pens for the accommodation of bulls and other animals, and it consists of an arrangement whereby the manger will occupy one inside corner of the pen and be an integral part thereof. Also in providing the manger with an inclosure similar to that used to form the pen itself, and with means to hold the head of the animal in the manger or to shut him out of the manger while he is loose in the pen. Also of other features which will be fully described in this specification and definitely set forth in the claims.

In the accompanying drawings forming a part of this specification, Figure 1 is a side perspective of a portion of an animal pen containing my invention. Fig. 2 is an inside perspective of the same. Fig. 3 is a plan view of the same.

Referring to the drawings "A" represents the top-rails, "B" the corner posts, and "C" the upright railings or fillers of an animal pen, the corner posts and fillers being preferably set in curbs "D". Connected to the top-rails "A" is a bent piece "E" which forms an inside top-rail to which inside railings or fillers "F" are attached to form the inclosure for the manger. It is preferable that the ends of the top-rail "E" shall stand approximately at right angles to the top-rails "A" to which they are attached, and that the central part of this top-rail shall stand at approximately 45 degrees to its ends. This construction will give the head of the animal the most room and the widest range of movement in the manger, and at the same time will take up the least amount of space in the pen.

"M" represents the manger proper.

The lower ends of the railings or fillers "F" are preferably set in a curb "G" which is made to conform to the shape of the top-rail "E" and is made higher than the curbs "D." To make the manger more symmetrical and to afford better protection to the feed which may be placed in the manger the portions of the outside curb "G'" forming the outside portions of the manger are made to correspond in height and in general contour with the portions "G" of the inside curb.

The central part of the manger curb "H" is preferably made lower than the other parts, being cut out so as to give more room for the neck of the animal when his nose is down in the manger. Immediately above the cut out portion of the curb a horizontally disposed member "I" is inserted, and is preferably secured to the adjacent railings or fillers "F", as shown by dotted lines, the raised sides of the manger curb "G" also assisting to hold this member in position.

Stanchion bars "J J" are pivoted to the member "I" and are extended up to the top-rail "E" and are provided with plates "P" adapted to straddle and slide on the top-rail "E," hooks "L" pivoted between the upper ends of said plates and adapted to engage catches "K" secured to the part of the top-rail "E" between the stanchion bars "J." When a bull's head is placed in the manger and the stanchion bars "J" are closed and latched on the catches "K," his head will be securely held therein, and with the aid of the railings or fillers "F" he cannot injure an attendant who may be in the pen cleaning him, renewing the bedding or doing other work in the pen. At the same time, the bull's head being inside the outside closure of the pen, he cannot get at or injure anyone who may be close to the pen. Heretofore these stanchion bars have been used on the sides of the pen, so that when the bull is fastened by the stanchion bars his head would be on the outside of the pen, and an outside inclosure would have to be added to the pen to guard the bull's head and protect the feed in the manger if any manger was used.

By means of my invention an outside inclosure, which would frequently be in the way, is not needed. The entire manger inclosure is within the limits of the pen and in one of the corners where it will occupy the minimum amount of space. The animal's head can either be shut in the manger so it will be safe for an attendant to work in the pen, or be shut out of the manger when the animal is loose in the pen, so it will be safe to work in the manger.

The drawings show a gate in one of the outer sides of the manger for convenience in placing things in the manger or removing them therefrom. The entire arrangement is simple, compact, effective and convenient.

What I claim is:

1. In an animal pen, a manger located in one of the corners within the inclosure of the pen, a partition separating the manger from the remainder of the pen and having an opening to admit an animal's head into the manger compartment, and means to hold the animal's head in the manger compartment and to release it therefrom.

2. In an animal pen provided with horizontal top-rails and vertically disposed side rails secured thereto, a manger located in one corner of the pen, a top-rail conforming to the general contour of the inner side of the manger connected to the outside top-rails, a curb forming the inner side of the manger below said top-rail and vertically disposed railing set in the curb and connected to said top-rail.

3. In an animal pen provided with horizontal top-rails and vertically disposed side rails secured thereto, a manger located in one corner of the pen, a top-rail conforming to the general contour of the inner side of the manger connected to the outside top-rails, a curb forming the inner side of the manger below said top-rail, vertically disposed railing set in the curb and connected to said top-rail, and a stanchion mounted therein, as and for the purpose set forth.

4. In a device of the character described, a manger located in a pen and having a railing forming a partition between the manger and the pen, a curb surrounding the manger, a cut-out in the inner side of the curb, vertically disposed spaced apart railing members adjoining the ends of the cut-out, a horizontally disposed member located immediately above the central portion of the cut-out and having its ends embedded in the raised portions of the curb and connected to the spaced apart railing members, and a stanchion mounted on the horizontal member.

WILLIAM LOUDEN.

Witnesses:
GERTRUDE K. FOWLER,
RUTH E. LARSON.

Copies of this patent may be obtained for five cents each, by addressing the "Commissioner of Patents, Washington, D. C."